United States Patent
Kaftory et al.

(10) Patent No.: US 8,126,264 B2
(45) Date of Patent: Feb. 28, 2012

(54) DEVICE AND METHOD FOR IDENTIFICATION OF OBJECTS USING COLOR CODING

(75) Inventors: Ran Kaftory, Kiryat Tivon (IL); Ronen Horovitz, Haifa (IL)

(73) Assignee: Eyecue Vision Technologies Ltd, Haifa (IL)

( * ) Notice: Subject to any disclaimer, the term of this patent is extended or adjusted under 35 U.S.C. 154(b) by 947 days.

(21) Appl. No.: 12/106,387

(22) Filed: Apr. 21, 2008

(65) Prior Publication Data

US 2008/0260244 A1 Oct. 23, 2008

Related U.S. Application Data

(60) Provisional application No. 60/907,853, filed on Apr. 19, 2007.

(51) Int. Cl.
*G06K 9/00* (2006.01)
*G06K 9/18* (2006.01)

(52) U.S. Cl. ...................................... 382/165

(58) Field of Classification Search .............. 382/162, 382/164, 165, 167, 181, 276, 294; 358/3.26, 358/452, 453, 515, 518, 537, 538
See application file for complete search history.

(56) References Cited

U.S. PATENT DOCUMENTS

| | | | |
|---|---|---|---|
| 5,363,212 A * | 11/1994 | Taniuchi et al. | ............. 358/452 |
| 5,426,289 A | 6/1995 | Kinoshita et al. | |
| 7,180,524 B1 | 2/2007 | Axelrod | |
| 7,210,631 B2 | 5/2007 | Sali et al | |
| 7,555,157 B2 * | 6/2009 | Davidson et al. | ............. 382/154 |
| 7,672,027 B2 * | 3/2010 | Nakayama et al. | ........... 358/498 |
| 2002/0150291 A1 * | 10/2002 | Naf et al. | ...................... 382/162 |
| 2005/0100204 A1 | 5/2005 | Afzal et al. | |
| 2006/0228027 A1 * | 10/2006 | Matsugu et al. | ............. 382/181 |
| 2006/0251320 A1 | 11/2006 | Diederichs et al. | |
| 2008/0199194 A1 * | 8/2008 | Ishibashi | ........................ 399/49 |
| 2008/0260244 A1 * | 10/2008 | Kaftory et al. | ................ 382/165 |
| 2010/0085385 A1 * | 4/2010 | Nagamasa | .................... 345/660 |

FOREIGN PATENT DOCUMENTS

WO  WO 00/04711  1/2000

OTHER PUBLICATIONS

International Search Report of Application No. PCT/IL08/00525 issued on Sep. 2, 2008.

* cited by examiner

*Primary Examiner* — Amir Alavi
(74) *Attorney, Agent, or Firm* — Pearl Cohen Zedek Latzer, LLP

(57) ABSTRACT

A device and method for detecting an object in an image by identifying color areas in the image where such colors are a pre-defined pattern of colors that may be printed on for example the object in the image. An imager may capture an image of an object that includes a pre-defined pattern of colored areas having known colors in a known or pre-defined location of an object. The imager may transmit image data to a processor which may identify the pre-defined pattern of pre-defined colors on a pre-defined area of an object in the image. The processor may search for a value that may be stored for example in a data base of a memory, where such value corresponds to the detected pattern.

10 Claims, 3 Drawing Sheets

DEVICE AND METHOD FOR IDENTIFICATION OF OBJECTS USING COLOR CODING

CROSS REFERENCE TO RELATED APPLICATION

This application claims the benefit of U.S. Provisional Application No. 60/907,853, filed on Apr. 19, 2007 entitled "Algorithm and Method for Identification of Objects Using Color Coding and a Camera", incorporated herein in its entirety.

FIELD OF THE INVENTION

This application relates to color imaging and calibration, and particularly, to identifying an object in an image captured in uncontrolled lighting conditions, where the identification is based on a color-code that appears on the object.

BACKGROUND OF THE INVENTION

Identification of objects in an image captured by a digital imaging device may rely on extracting features of the object and using pattern recognition of those features to identify the object. Pattern recognition and feature extraction may be subject to inaccuracies caused by among other things lighting conditions, changes in object orientation, relative distance of the object from the imager and occlusion. Typical identification processes may therefore entail rotation, translation and scale invariant features and may call for complicated pattern recognition algorithms. Adding a new object to the recognition task may therefore require adjusting a recognition algorithm used and compensation for lighting condition.

SUMMARY OF THE INVENTION

A demonstrative embodiment of the invention may include a method of identifying a pre-defined pattern of pre-defined colors on a pre-defined area of an object in an image, and issuing a signal that said detected pattern corresponds to a value stored in a memory. In some embodiments, the pre-defined area includes a first area, and the step of identifying the pre-defined pattern includes locating the colors on the area of the object in the image, based on the proximity of the first area relative to a second area of the object, the second area having a known color. In some embodiments, the step of identifying the pre-defined patterns includes locating the colors on the first area of the object in the image by the proximity of the first area relative to the border of the object.

In some embodiments, the step of identifying the pre-defined patterns includes locating a repetitive pre-defined pattern of said colors. In some embodiments, the step of identifying the pre-defined patterns includes locating a dividing color between a first repetition of the pre-defined pattern of colors and the repetition of the pattern of colors.

In some embodiments, a method may include calibrating an imager to identify colors in the image, the calibrating includes automatically identifying a reference image captured by the imager and associating a color in the reference image with a pre-defined color.

In some embodiments a method may include capturing the image of the object at a distance of between 10 cm. and 5 meters from an image capture device. In some embodiments, a method may include capturing image of object in conditions of ambient lighting. In some embodiments, the method may include capturing the image of the object where the object is partially occluded. In some embodiments, the method may include capturing the image of the object, where the object is rotated at an angle to an image capture device.

A demonstrative embodiment of the invention includes a method of calibrating a color captured by an image with a known color, where the calibration is achieved by automatically identifying a boundary of an object in a reference image captured by an imager, identifying a color is said based on a proximity of said color to said boundary and associating the identified color with a known color, where the association is not dependent on a location of the color within the reference image. In some embodiments, the step of automatically identifying the object in the boundary includes filtering a binary image of the image. In some embodiments, the filtering of the binary image includes shape detection in the image. In some embodiments, the step of identifying the color includes executing a color clustering function on the identified color, and comparing a result of the function to the known color.

A demonstrative embodiment of the invention may provide a device including figure, a series of colored areas having pre-defined colors in a known pattern, the colored areas discernible by an imager, a base color area in a known proximity to the colored areas, where the figure is associated with a value stored in a memory, and the pattern is associated with this value. In some embodiments, the colored areas include a colored area, where the colored area of said colored areas is of a size sufficient to be discerned by at least one pixel of an imager at a distance of the object from the imager of between 10 cm. and 5 meters. In some embodiments, the known pattern of the colored areas repetitively appears on the device. In some embodiments, the base color is white.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

DETAILED DESCRIPTION OF THE PREFERRED EMBODIMENTS

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "selecting," "evaluating," "processing," "computing," "calculating," "associating," "determining," "designating," "allocating" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. In some embodiments, one or more methods of embodiments of the invention may be stored on an article such as a memory device, where such instructions upon execution result in a method of an embodiment of the invention.

In some embodiments of the invention, there may a game in which a user may be requested to provide a correct answer by presenting an object to an imager. A display device, associated with a processor may show a figure to the user. The user may then be required to produce an object with the appropriate response to the imager. For example, the display device may show the user the equation of "1+1". In another example, the display may show the user a letter or a number or a picture. The user may then be required to provide an appropriate answer. The user may provide the answer by selecting an object showing the appropriate answer and showing the object to the imager. The processor, which is linked to the imager may then determine if the correct answer was provided. If the correct answer provided, the processor may then issue a signal to the user, that the answer was indeed correct.

Figure 1:
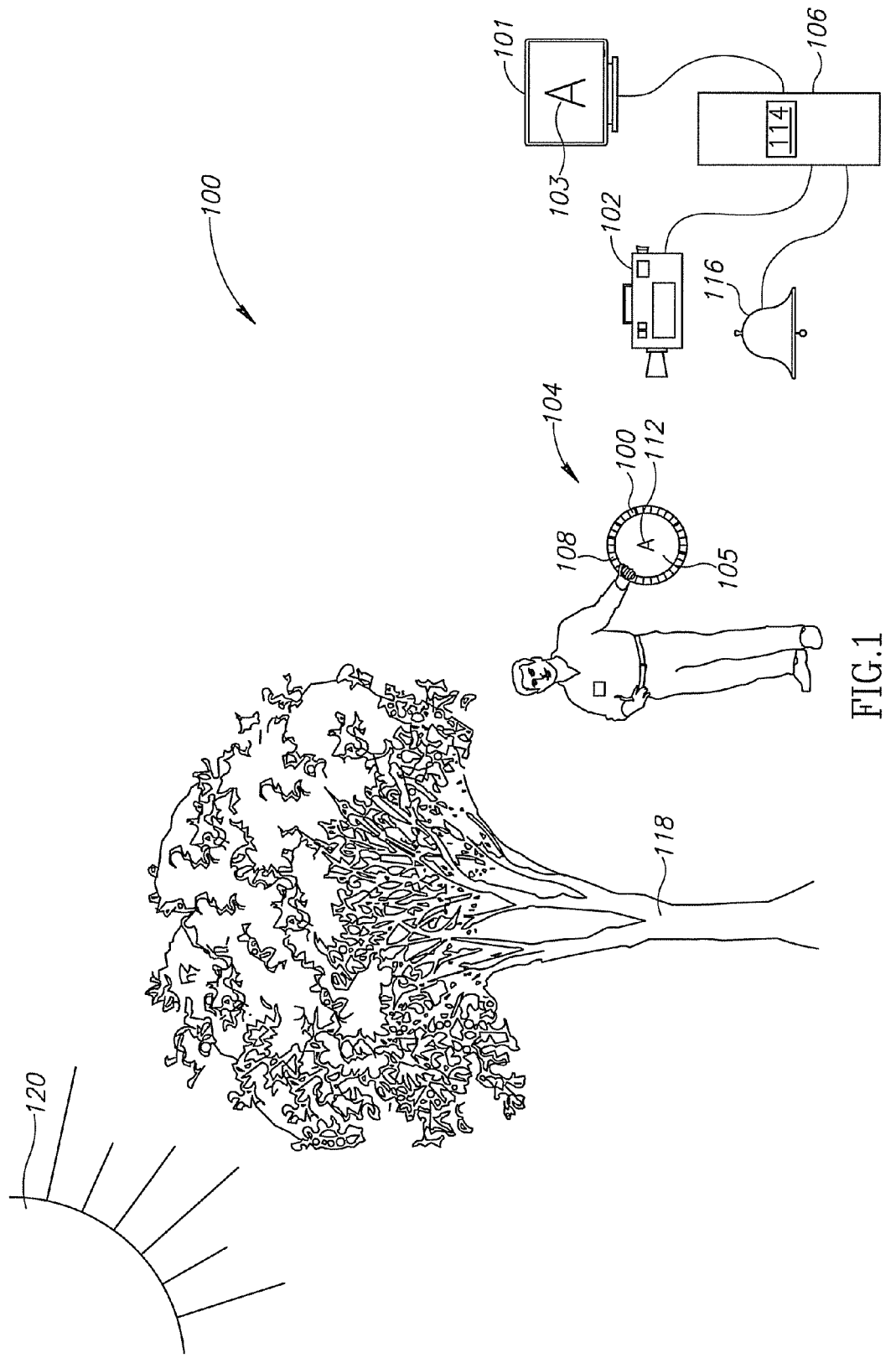
FIG. 1 is a schematic diagram of a system including an imaging device, a processor, and an object to be identified in accordance with an embodiment of the invention.

FIG. 1 is a schematic diagram of a system including an imaging device, a processor, and an object to be identified in accordance with an embodiment of the invention. In some embodiments, a system 100 may include for example a screen or display device 101 that may be connected or associated with a processor 106, and an imager 102 that may capture an image of an object 104, and relay or transmit digital information about the image to processor 106. Object 104 may include or have thereon a number of colored areas 108 that may be arranged for example in a known or pre-defined pattern, such as a series of bars, circles, rectangles or other shapes, on an area of object 104, such as a rim or perimeter 110 of object 104 or on other areas of object 104. Object 104 may include an area 105 that is not colored, or that is colored or blank. For example, the color of area 105 may be white. In some embodiments, in a middle or other part of the blank or white space or on some other part of object 104, there may be affixed, attached or printed a mark, such as a shape, number, letter, drawing or other figure 112 to be identified. A list of patterns of colored areas 108 may be associated with one or more objects 104 or figure 112 that may be attached to object 104, and such lists and associations may be stored in a memory 114 that may be connected to processor 106.

In some embodiments, the processor 106 and memory 114 may be part of a personal computer. In further embodiments, the processor 106 and memory 114 may be part of any computer system, for example, laptops.

In operation, display 101 may show or display figure 103, such as a letter "A", a number, or a picture to for example, a user. The user may then find an object that matches or otherwise corresponds to the displayed figure 103, such as a card or other object that may have a letter "A" printed on or attached to it. The user may raise or otherwise expose the object to imager 102, which may capture an image of the object 104 and of the colored areas 108 that may be printed on, attached to or otherwise make up a part of object 104. The image may be transmitted to processor 106 which may find or discern the pattern of the colored areas 108 on the object 104 in the image. Processor 106 may search memory 114 for a numerical or other value of the identified pattern of colored areas 108, and may determine that the particular pattern that appeared in the image is associated with a value that may have been assigned to figure 112 that was shown on display 101. Upon a detected match between the displayed figure and the figure 112 exposed to the imager, processor 106 may issue a signal to for example to an audio, visual or other indicator or calculator, such as a bell 116, or a speaker, or a flashing light, to indicate that the figure 114 captured in the image corresponds to the figure shown on display 101. For example, a letter "A" may be associated with a value 555 as such value and association may be stored in memory 114. A card having a letter "A" as a figure 112, may include a color pattern that also corresponds to or is associated in memory 116 with a value 555. Processor 106 that signaled display 101 to show an "A" to a user may detect a match between the value associated with the displayed figure 103 and the color pattern.

In some embodiments, a pattern of colored areas 108 may be identified even if the image is captured in an uncontrolled environment such as for example against a non-uniform background 118, and under uncontrolled lighting and shadow conditions, such as direct or indirect light, sunlight 120, indoor ambient light or other non-uniform lighting conditions.

In some embodiments, a pattern of colored areas 108 may be identified even if an orientation of object 104 relative to imager 102 is other than perpendicular to the light entering or reflecting back to imager 102. For example, object 104 may be held at an acute or other angle to imager 102, may be rotated, partially occluded by for example interfering objects such as a hand of a user, or otherwise incompletely imaged, and imager may still be able to detect and identify at least a part of the a repetitive pattern of colored areas 108.

In some embodiments, a pattern of colored areas 108 may be identified at various distances of object 104 from imager 102, such as for example from 10 cm. to up to 5 meters or more. In some embodiments, the distance from imager 102 at which a pattern of colored areas 108 of object 104 may be identified, may be dependent on for example a resolution of imager 102.

In some embodiments, imager 102 may be or include a suitable digital imager such as a CCD, CMOS or other video or still digital image capture device capable of capturing and transmitting color image data. In some embodiments a low resolution camera such as those typically included in a webcam or network capable camera configuration, having a resolution of 320×240, may be suitable for an embodiment of the invention.

In some embodiments, processor 106 may be or include a DSP or a Pentium™ IV or higher processor or other comparable processor typically used in a home computing configuration. Memory 114 may be or be included in any suitable data storage device such as a hard drive, flash, or other electronic data storage on which may be stored for example a data base, array, tree or other data storage structure. In some embodiments display 101 and bell 116 may be or be included in a single device such as for example a display and sound system that may indicate to a user that a match or other action is correct, incorrect or otherwise responsive to a question, challenge or other signal posed to the user.

Figure 2:
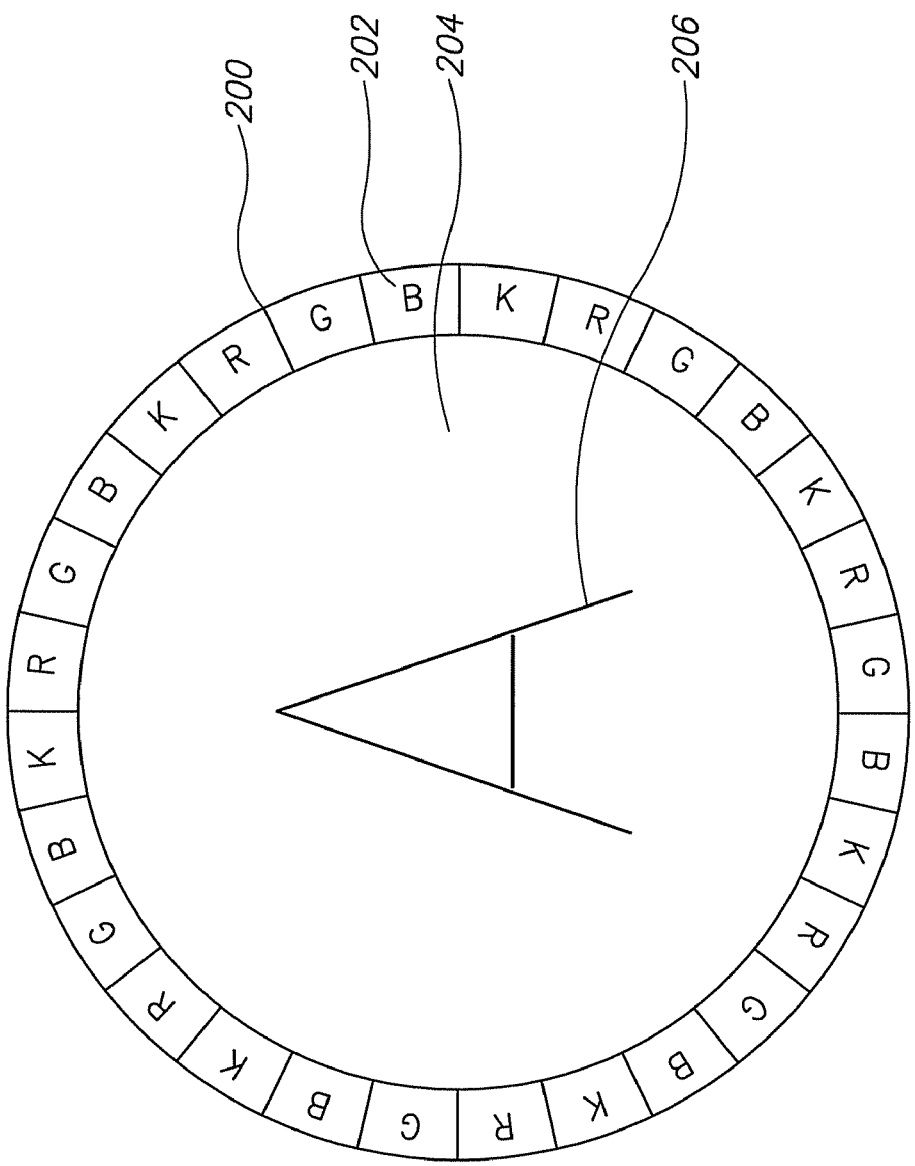
FIG. 2 is an example of an object that may be identified in accordance with an embodiment of the invention.

FIG. 2 is an example of an object that may be identified in accordance with an embodiment of the invention. In some embodiments, object 200 may be or include a flat, spherical, cubical or other shaped object that may be suitable to be moved, raised or otherwise maneuvered by for example a user or some other system to be brought into an area to be imaged by imager 102. In some embodiments, object 200 may be a card or disc that may be or include cardboard, plastic or other semi-rigid material. Object 200 may include a ball, toy, manufactured device or other item as long as the color pattern can be printed, attached, stamped on or stuck to it.

Attached or imprinted on for example an outside perimeter of object 200 may be a series of colored areas 202 that may create a pattern of for example repeating or repetitive colors. Colored areas 202 may be of any shape, such as rectangular. In a preferred embodiment, colored areas 202 are preferably distinct from each other, rather than blurred or runny. The pattern of colored areas 202 may form any geometrical shape (e.g. lines, circles etc.) or may take on other configurations. The pattern of colored areas 202 may be marked on object 200 on one, some or all sides exposed to the imager. Object 200 may include any tactile object.

Sequences of colored areas 202 may include at least two colors, though the variations of colors and hence the number of items or figure 206 associated with a distinct pattern of colored areas 202 may increase with increased number of possible colors included in the colored areas 202. The size of each colored area 202 may be determined by for example the intended distance between object 200 and imager 102 as well as by the resolution of imager 102, so that preferably at least one pixel received color data from a particular color area 202 detected by imager 102.

Localization of the colored areas 202 around a perimeter, rim, edge or other pre-defined area of object 200 may speed the detection or identification of the pattern of the colors once the object 200 is detected in an image. Similarly, repetition of the pattern may allow identification of the pattern even when the object is partially occluded or when an orientation of object 200 in an image partially blocks its exposure to the imager 102.

A particular pattern or sequence of colored areas 202, such as for example Red-Green-Blue (RGB) may be pre-defined and stored in memory 114, where the pattern may be associated with a value that may be further associated with an object or figure 206. In some embodiments, a color may appear only once in a pattern, in which case the number of permutations may be defined as $$(n)_r = \frac{n!}{(n-r)!}$$

where n is the number of colors from which we can choose, r is the number to be chosen and "!" is the factorial symbol. For example, if four colors are possible, and any three may appear in a pattern there may be 4!/(4−3)!=24 permutations. If n=r (meaning the number of chosen colors is equal to the number of colors to choose from; then the formula becomes $$\frac{n!}{(n-n)!} = \frac{n!}{0!} = n!$$

where 0!=1. In the given example, we stay with 24 permutations.

In some embodiments, the pattern of colored areas may include a repetitive sequence such that cyclic shifts of a specific sequence are considered similar. For example, when n=3: the following three patterns RGBRGBRGB, GBRGBRGBR, RGBRGBRG, may be considered to be the same for purposes of recognizing the pattern in the image. Therefore, in the given example, the equation of n!/n=(n−1)!, may result in there being 6 permutations, for n=4. To overcome this limitation a sequence may include a specific color, such as black (k), for example, which may represent the beginning of the sequence, such as kRGBkRGBkRGB . . . where k represents the black separating color, so that a greater number of patterns may be represented by n!. In some embodiments, any color such as grey or white may be used in order to represent the beginning of the sequence.

To further enlarge the number of possible codes without using more colors, a given color may be used as a separator, and two other colors may be used for creating sequences of two regions, three regions, four regions and so on. This will allow, for example, $2^2+2^3+2^4+2^5=60$ permutations. However, since the pattern may include adjacent color regions, two adjacent regions of the same color may be hard to distinguish, therefore a fourth color may be used as an indicator of the previous color, so that instead of kRRGkRRG . . . a pattern may be kRBGkRBG, whereas the second R is replaced by B.

In some embodiments, the captured image may be transformed by processor 106 that may identify and detect the color pattern. An image may be analyzed for the presence and detection of the object 200 by for example scanning the image for a base color object such as the base color area 204. In some embodiments, the base color area may be for example white or a standard color not included in the pattern. Pixels in the image may be scanned and classified as white pixels or non-white pixels. In some embodiments, such a determination may be executed in (H,S,V) color space, using the following formula V(x,y)*(1−S(x,y)), as an indicator, as white pixels have a high intensity value (V) and a low saturation value (S). After simple thresholding, a determination may be made for each scanned pixel as either white or non-white. The result of this scanning may be a binary image containing white and non-white segments. Morphological operations such as area opening may be executed on the binary image to filter out small noisy artifacts. White areas 204 in the image may be dilated and labeled into connected components and the white segments of the binary image may be analyzed to locate exterior or outside boundaries of one or more of such white areas 204. Pixels along such perimeters, or boundaries of the designated white areas 204 may be traced, and the color values of such pixels may be saved for later analysis. Connected pixels in the boundary area may be collected into vectors containing the (R,G,B) values of the pixels surrounding the one or more white areas 204. In some embodiments, shape detection of the image may be used in order to automatically identify the boundary of the binary image.

Pixels in the boundary areas around white areas 204 may be classified into one of the pre-defined colors as were designated for inclusion in the pattern of colored areas. The classification can be performed by known techniques such as using predefined look-up tables for brightness measures of the pixels or classifying based on a distance measure of spectral characteristics such as chroma coordinates in a color space, preferably (H,S,V) or (L,a,b), k-means classification or any other method.

Upon such classification, a vector of colors or color values may be assembled for the boundary pixels of one or more of the white areas 204. Since the pattern of color areas includes a color region, there is a high probability that more than one pixel of the same color is adjacent in boundary area and in the vector of pixels in the boundary area. Hence, a new vector may be created where all adjacent similar pixels are joined and are represented by a single pixel of that color. The vector may be tested against the set of pre-defined vectors representing the patterns of colored areas 202 that may be present in the colored area 202. This comparison of the pixels surrounding a white area 204 in the image to the pixel values predicted in a boundary or perimeter of object 200 may be performed by simple comparisons or correlations. If the boundary area corresponds to a perimeter of an area of object 200, there is a high probability that the color values of the pixels in the boundary area will correspond to color values of the pre-defined colors in a colored area 202.

The variations of the colors along the extracted vector of boundary pixels may be checked against all possible patterns of colors in a colored area 202. If a repetition of a color sequence is found, and the number of repetitions is above some pre-defined threshold, the pattern may be extracted and the object 200 may be associated with the identified pattern of colored areas 202.

In some embodiments, the color pattern may be repetitive, so it is likely that more than one sequence of the pattern is appears in the vector. A probability function for the pattern may be used to verify the object classification by taking into account not only the presence of a code or pattern and the number of times it appears, but also the number of adjacent sequences. The pattern with the highest probability may be chosen as representing the pattern associated with the object 200. In some embodiments, this procedure may be applied in consecutive frames of an image and the confidence of classification may be increased if same pattern is selected on a consecutive frames.

In some embodiments, color patterns can be attached to objects such as white cards with no figure on them, and the user may adhere an image or draw an image on the blank cards. For example, a pattern associated in memory 206 with "My Pet", may be attached to a picture of a user's pet, and the blank card may be recognized by the system as being associated with the pet.

In some embodiments, patterns of colored areas 202 may not be discernible to the human eye, as they may be implanted within a picture or item that is observed by the imager 102 in a way which is integrated into the figure itself. For example, a letter, number or figure 206 may be drawn to include a color pattern that may be identified by the imager 102.

In some embodiments, the location of colored areas 202 in a pre-defined proximity to a known area such as a white area 204, as well as the limited number and pre-defined colors that are included in colored areas 202, may simplify a color calibration process. For example, the calibration process may be limited to the pre-defined colors known to be present in the colored areas 202. The calibration process may identify the probable location of the known colors through the transformation process described above, and may through a clustering process, using for example a means-shift or K-means algorithm on the likely area of the colors, calibrate the brightness of the pixels that appear in such area with the colors that are known to be present. This calibration process may be performed automatically once object 200 is exposed to the imager 102, and may be preformed as part of or just before the identification of the colored areas 202. This calibration process may allow identification and detection of colors in a wide variety of lighting conditions such as for example sunlight, shade and ambient indoor light.

In some embodiments, a difference of a focal distance between pixels capturing the colored area 202 on a perimeter of an object 200 from a focal distance of pixels capturing other objects in the image may further speed an identification of colored areas 202 of object 200. The placement of colored areas 202 on a perimeter of object 200 may further enhance a difference between a focal distance of pixels capturing the colored areas 202 and pixels capturing more distant objects.

Figure 3:
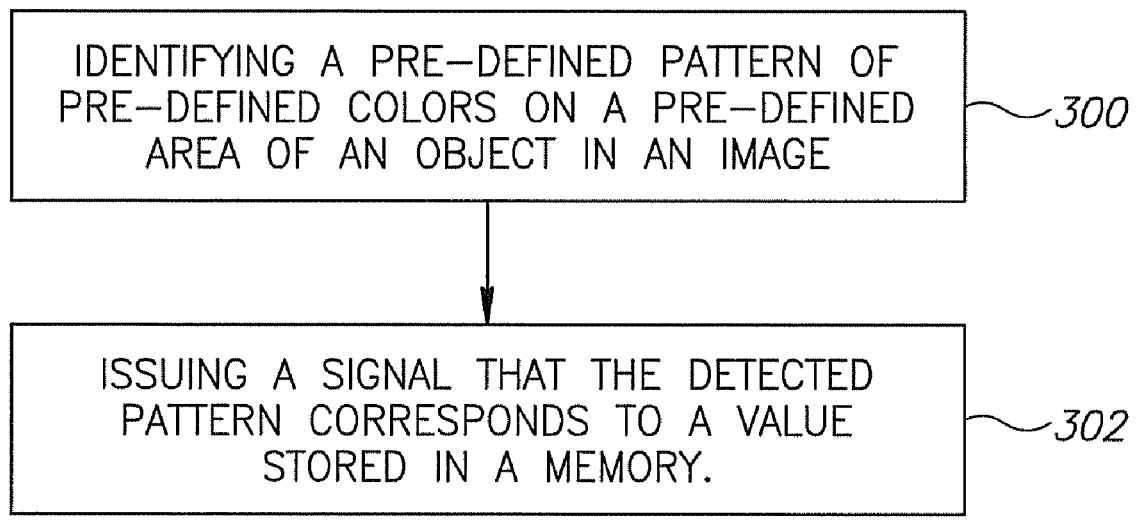
FIG. 3 is a flow diagram of a method in accordance with an embodiment of the invention.

Reference is made to FIG. 3 a flow chart of a method in accordance with an embodiment of the invention. In block 300, an imager may capture an image of an object that includes a pre-defined pattern of colored areas having known colors in a known or pre-defined location of the object. The imager may transmit image data to a processor which may identify the pre-defined pattern of pre-defined colors on a pre-defined area of an object in an image.

The processor may search for a value that may be stored for example in a data base of a memory, where such value corresponds to the detected pattern. In block 302, in response to the search, the processor may issue a signal to indicate that the found value corresponds to a prompted request, such as a request that a user expose a card to the imager that includes a particular pattern of colors. In some embodiments, a processor may calibrate one or more colors in a colored area that may appear on an object at the time of, or before beginning a pattern detection process. In some embodiments, a calibration process may locate a known area on an object, such as a base color area, and may rely on a known proximity of colored areas to the located base color area to collect color information from the proximate areas, and may calibrate the collected color data to known data about the colored area. In some embodiments, the base color area may be for example white or a standard color not included in the pattern. Such calibration process may permit automatic location of the colored areas for calibration purposes. Similarly, the calibration may allow use of the system or method in uncontrolled lighting environments and backgrounds.

It will be appreciated by persons skilled in the art that embodiments of the invention are not limited by what has been particularly shown and described hereinabove. Rather the scope of at least one embodiment of the invention is defined by the claims below.

We claim:

1. A method comprising:
   using a processor to identify a pre-defined pattern of pre-defined colors on a pre-defined area of an object in an image; and
   using said processor to issue a signal that said detected pattern corresponds to a value stored in a memory.

2. The method as in claim 1, wherein said pre-defined area comprises a first area, and wherein said using a processor to identify comprises using said processor to locate said colors on said area of said object in said image, based on a proximity of said first area relative to a second area of said object, said second area having a known color.

3. The method as in claim 2, wherein said using a processor to identify comprises using said processor to locate said colors on said first area of said object in said image by a proximity of said first area relative to a border of said object.

4. The method as in claim 1, wherein said using a processor to identify said pre-defined patterns comprises using said processor to locate a repetitive pre-defined pattern of said colors.

5. The method as in claim 4, wherein said using a processor to identify comprises using said processor to locate a dividing color between a first repetition of said pre-defined pattern of colors and a said repetition of said pattern of colors.

6. The method as in claim 1, comprising using said processor to calibrate an imager to identify colors in said image, said calibrating comprising automatically identifying a reference image captured by said imager and associating a color in said reference image with a pre-defined color.

7. The method as in claim 1, comprising using said processor to capture said image of said object at a distance of between 10 cm. and 5 meters from an image capture device.

8. The method as in claim 1, comprising using said processor to capture said image of said object in conditions of ambient lighting.

9. The method as in claim 1, comprising using said processor to capture said image of said object wherein said object is partially occluded.

10. The method as in claim 1, comprising using said processor to capture said image of said object wherein said object is rotated at an angle to an image capture device;

said object is rotated at an angle to an image capture device.

* * * * *